(12) United States Patent
Blacklaw (10) Patent No.: US 9,019,508 B2
(45) Date of Patent: Apr. 28, 2015

(54) FIBER OPTIC GYROSCOPE ARRANGEMENTS AND METHODS

(76) Inventor: David Blacklaw, Houston, TX (US)

( * ) Notice: Subject to any disclaimer, the term of this patent is extended or adjusted under 35 U.S.C. 154(b) by 1501 days.

(21) Appl. No.: 12/469,994

(22) Filed: May 21, 2009

(65) Prior Publication Data

US 2010/0296100 A1    Nov. 25, 2010

(51) Int. Cl.
*G01C 19/72* (2006.01)
*E21B 47/024* (2006.01)
*E21B 47/12* (2012.01)

(52) U.S. Cl.
CPC ............. *E21B 47/024* (2013.01); *E21B 47/123* (2013.01); *G01C 19/728* (2013.01)

(58) Field of Classification Search
USPC .................. 356/459, 460, 462, 465, 470, 471
See application file for complete search history.

(56) References Cited

U.S. PATENT DOCUMENTS

| | | | |
|---|---|---|---|
| 5,416,585 A | | 5/1995 | Hadeler |
| 5,465,150 A | | 11/1995 | Malvern |
| 5,579,110 A | * | 11/1996 | Touchberry et al. .......... 356/459 |
| 6,198,094 B1 | * | 3/2001 | Freier et al. .............. 250/231.12 |
| 6,823,602 B2 | | 11/2004 | Noureldin et al. |
| 7,295,323 B2 | * | 11/2007 | Kaliszek et al. .............. 356/465 |
| 2010/0079766 A1 | * | 4/2010 | Justin ........................... 356/465 |

* cited by examiner

*Primary Examiner* — Jonathan Hansen
(74) *Attorney, Agent, or Firm* — Osterrieder, LLC (57) ABSTRACT

This disclosure provides methods, systems and devices that may be used to measure, calculate, and orient a device such as a drill bit in a downhole environment. To that end, disclosed are fiber optic gyroscopes, wherein the fiber optic gyroscopes comprise elliptical fiber optic cable coils in a mutually orthogonal arrangement that is tilted relative to a longitudinal axis of a supporting shaft, e.g., tube. Light travels in opposite directions within each of the elliptical fiber optic cable coils, and, subsequently, sensors detect differences in time for each light path of the light that traveled in opposite directions within each one of the elliptical fiber optic cable coils. The elliptical nature of the fiber optic cable coils minimizes the cross-sectional area of the mutually orthogonal arrangement, and thereby makes it well-suited for use in downhole environments where space is at a premium. This disclosure also may provide an inertial measurement unit.

68 Claims, 6 Drawing Sheets

FIBER OPTIC GYROSCOPE ARRANGEMENTS AND METHODS

BACKGROUND

Gyroscopes are devices used for measuring orientation of another device or system ultimately for optional navigation of the same. Although there are different types of gyroscopes, they are principally used to measure the rotation, in any direction, of a device or system undergoing a change in orientation. Being free to take any orientation, a classical, rotary, or optical gyroscope exploits some physical property in order to permit detection of the rotation, also referred to as the azimuthal component herein, about some axis. Optical gyroscopes, which normally use lasers, are appealing because moving parts are eliminated or reduced as compared to classical or rotary gyroscopes, and thus are not susceptible to mechanical wear or drifting.

Sometimes paired with gyroscopes are accelerometers, which measure forces due to acceleration or gravity, i.e., a difference of position, of another device or system for optional navigation of the same. With accelerometers permitting measurement of the magnitude and direction of gravitational acceleration, e.g., the inclination, for the underlying device or system, then, when coupled with gyroscopes, an inertial measurement unit ("IMU"), the main component of inertial guidance systems, arises.

Problems remain, however, with gyroscopes, such as those used within IMUs. In real world applications, gyroscopic components of IMUs often require excessive space as compared to the space actually available in the particular environment, such as in a downhole drilling assembly in an oil field application. However, merely decreasing the size of the gyroscopes is insufficient because accuracy of gyroscopic measurements also decreases with decreasing the size of gyroscopes. Furthermore, gyroscopes may be sensitive to physical changes, such as temperature, pressure and shock, of a surrounding environment, wherein protecting gyroscopes from a malefic surrounding environment is paramount to ensure accurate measurements, especially in the case where orientation and navigation of an underlying device relies on the integrity of gyroscopic measurements. According, what is needed, are devices, methods and systems that provide solutions to these example problems.

BRIEF SUMMARY

One example embodiment includes a method for receiving light, whether externally or internally, and transmitting light in fiber optic gyroscopes located on a tube, wherein the fiber optic gyroscopes comprise elliptical fiber optic cable coils in a mutually orthogonal arrangement, wherein the mutually orthogonal arrangement is tilted relative to a longitudinal axis of the tube. Further, the method includes travelling, by the light, in opposite directions within each of the elliptical fiber optic cable coils. Further still, the method includes detecting, by one or more sensors, one or more differences in time for each light path by the travelling of the light in the opposite directions within each one of the elliptical fiber optic cable coils. In alternative, example, method embodiments, there is no tube or other similar type of supporting regardless of shape. In such a case, the mutually orthogonal arrangement defining the fiber optic gyroscope arrangement is tilted relative to a horizontal plane having a vertical plane normal to the horizontal plane. In further example embodiments, the foregoing example embodiments may optionally include one or more accelerometers, logic reduced partially or completely to hardware and/or software for calculating orientation, and a processor-based device that may execute the associated logic.

Another example embodiment includes a system including a laser source providing light to fiber optic gyroscopes located on a tube, wherein the fiber optic gyroscopes comprise elliptical fiber optic cable coils in a mutually orthogonal arrangement, wherein the mutually orthogonal arrangement is tilted relative to a longitudinal axis of the tube. In addition, the system includes one or more sensors for detecting one or more differences in time for each path of the light travelling in the opposite directions within each one of the elliptical fiber optic cable coils. In alternative, example, system embodiments, there is no tube or other similar type of supporting regardless of shape. In such a case, the mutually orthogonal arrangement defining the fiber optic gyroscope arrangement is tilted relative to a horizontal plane having a vertical plane normal to the horizontal plane. In further example system embodiments, the foregoing example embodiments may optionally include one or more accelerometers, logic reduced partially or completely to hardware and/or software for calculating orientation, and a processor-based device that may execute the associated logic.

Yet another example embodiment includes a device including a tube having an exterior and fiber optic gyroscopes placed along the exterior, wherein the fiber optic gyroscopes located on a tube, wherein the fiber optic gyroscopes comprise elliptical fiber optic cable coils in a mutually orthogonal arrangement, wherein the mutually orthogonal arrangement is tilted relative to a longitudinal axis of the tube. In alternative, example, device embodiments, there is no tube or other similar type of supporting regardless of shape. In such a case, the mutually orthogonal arrangement defining the fiber optic gyroscope arrangement is tilted relative to a horizontal plane having a vertical plane normal to the horizontal plane. Furthermore, like methods and systems disclosed herein, the fiber optic gyroscope's arrangement may be maintained by the integral strength of material comprising the fiber optic gyroscopes alone, or, in by the addition of another material, such as an adhesive material, to provide sufficient integrity to the arrangement to obviate any need for a tube or other similar type of supporting shaft. In further example system embodiments, the foregoing example embodiments may optionally include one or more accelerometers, logic reduced partially or completely to hardware and/or software for calculating orientation, and a processor-based device that may execute the associated logic.

BRIEF DESCRIPTION OF THE SEVERAL VIEWS OF THE DRAWINGS

So that the manner in which the above recited features, advantages and objects of the present disclosure are attained and can be understood in detail, a more particular description of this disclosure, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for this disclosure may admit to other equally effective embodiments.

DETAILED DESCRIPTION OF THE INVENTION

The following is a detailed description of example embodiments of this disclosure depicted in the accompanying drawings. The embodiments are examples and are in such detail as to clearly communicate this disclosure. However, the amount of detail offered is not intended to limit the anticipated variations of embodiments; on the contrary, the intention is to cover all modifications, equivalents, and alternatives falling within the spirit and scope of the present disclosure as may be defined by the appended claims. The detailed descriptions below are designed to make such embodiments obvious to a person of ordinary skill in the art.

To drill oil or gas wells, a rotating drill bit is used, attached to a drill string. In an increasing proportion of cases, deviated or horizontal wells are drilled to provide a number of benefits, such as improved reservoir contact, or reduced spread of surface facilities. Management of the trajectory of such a well is termed directional drilling. Rather than relying on rotation of the entire drill string to rotate the drill bit, generally the drill string Bottom Hole Assembly ("BHA") includes a motor to rotate the drill bit below it. Drilling fluid is pumped into the drill pipe from surface to provide energy for the motor in order to lubricate various parts of the drill string and to transport the drilling debris or "cuttings" back to surface.

Measurement While Drilling (MWD) or Logging While Drilling (LWD) operations may be performed to aid in orienting and navigating of a borehole in the drilling oil or gas wells process. Measurement While Drilling ("MWD") surveying to guide the directional drilling process is conducted, providing the azimuth, deviation and tool face angles of the BHA. Accelerometers may be used to measure inclination, while magnetometers, or in some case, gyroscopes, may measure the well's rotation. The along-hole depth of the bit is derived from the combined length of the BHA and other drill string components run in the hole. Corrections may be applied for effects such as tension or compression in the string and temperature. The survey data versus time are matched to the depth versus time log to obtain data versus depth. Other sensors may be used to acquire other wellbore or formation evaluation data.

For non-oilfield applications, a range of alternative technologies may be used to overcome some of the challenges encountered in the downhole drilling environment. Gyroscopes, for example, have a number of advantages over magnetometers in that they are independent of any magnetic field present. Gyroscopes are affected by high temperature, however, which is a common feature of the downhole drilling environment. Gyroscopes are also susceptible to shock, and the accuracy of gyroscopic measurements deteriorates with reduction in size. Fiber optic gyroscopes ("FOGs"), however, are much less shock-sensitive, but accuracy is still limited by the physical size of the device. FOGs small enough to fit in the typical space available for downhole sensors or electronics are not sufficiently accurate for LWD applications. In this disclosure, three elliptical FOGs are arranged in a mutually orthogonal arrangement to provide through-bore capability, and are sufficiently large in size for accuracy, and, thereby able to function within or as an Inertial Guidance System ("IGS"). This arrangement is an improvement in that it dispenses with any requirement for magnetometers, while retaining the accuracy required for IGSs. The device is capable not only of measuring basic direction and inclination information on an absolute basis, but it also references these data directly to positional information, dispensing with the requirement to correlate data to depth via an intermediate time correlation. Such a device, used in conjunction with an intelligent rotary steerable tool ("RST"), may enable a full closed loop downhole, eliminating the need to transmit depth data to the RST from surface (in-well telemetry is typically of limited bandwidth, with high latency and very often without a down-link capability).

One type of gyroscope is a ring laser gyroscope ("RLG"), which uses interference of laser light within an optical ring to detect changes in orientation and spin. The technology was first demonstrated by Macek and Davis in 1963 and is now well-established in numerous commercial implementations, such as commercial airliners, ships, spacecraft and petrophysical surveying. It is particularly well-suited to inertial navigation systems due to its inherent high accuracy and reliability. RLGs' inherent advantage over alternate technologies is that there are no moving parts. In the conventional spinning gyroscope, the motion generates friction, which in turn leads to inherent drift terms. Additionally, RLG implementations can be lightweight and extremely robust, and, unlike classical gyroscopes, have no inertial resistance to changes in orientation. A related device is the FOG, which operates similarly to the RLG, but uses transmission paths within a coiled fiber optic cable. Two light beams travel along the fiber in opposite directions. Due to the Sagnac effect, the light beam traveling against the rotation experiences a slightly shorter path than the other beam. The resulting phase shift affects how the beams interfere with each other when they are combined. That is, there is a difference in path within the coils upon rotation of a device or system appending thereto. The intensity of the combined beam then depends on the rotation rate of the device. The fiber optic cable coil's light path can be several kilometers in length. Gyro bias (measured in degrees per hour output in the absence of input) is usually inversely proportional to the length of fiber; the longer the fiber optic cable coils is, then the better or more accurate the FOG is. Due to its lack of cross-axis sensitivity to vibration, acceleration, and shock, a FOG provides very precise rotational rate information, typically higher resolution than a RLG. The all-solid-state nature of FOGs gives them several advantages, including: low cost, long shelf life, rapid start-up, small size, low weight, rugged construction and an inherent immunity to electromagnetic interference.

There are challenges presented by FOGs and RLGs. For example, RLGs are high-voltage devices, and are susceptible to mechanical shock and vibration. FOGs typically display poorer drift and scale factor performance than RLGs. Performance increases with size, so small and high-performance units are mutually exclusive. And, FOGs are very temperature-sensitive. The present disclosure embodies improved MWD methods to overcome or mitigate some of these challenges through use of FOGS in a particular arrangement as discussed moreso herein.

Figure 1:
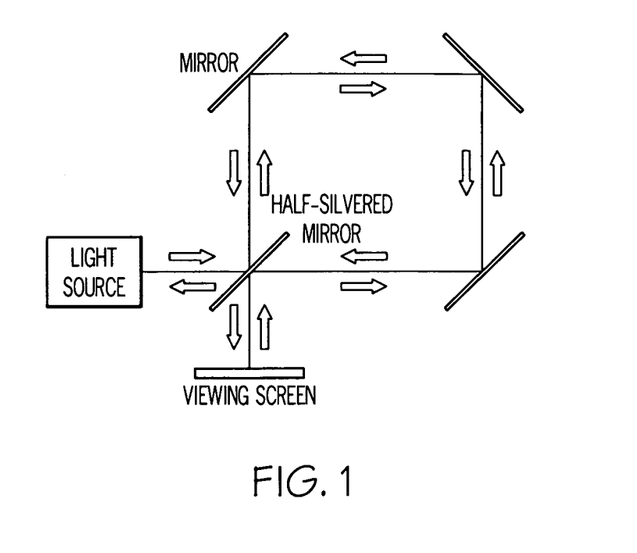
FIG. 1 depicts an example embodiment of a Sagnac interferometer in accordance with this disclosure.

Before turning to FOG arrangements, a discussion of some theory behind the functionalities of interferometry and gyroscopes ensues. The Sagnac effect is a phenomenon related to rotation. In ring interferometry, a beam of light is split and the two beams are directed along opposite trajectories in a closed circuit. On return to the point of entry, the light is recombined in such a way that an interference pattern is obtained. The position of the interference pattern depends on the angular velocity of the setup. FIG. 1 depicts an arrangement called a Sagnac interferometer. Usually several mirrors are used, so that the light beams follow a triangular or square signal path. In a FOG arrangement, the optical fiber is used to guide the light. The ring interferometer is mounted on a platform that can rotate. As the assembly rotates, the beam traveling in one direction will cover less distance than the other, such that at the point where the beams are recombined, the interference pattern generated is displaced an amount proportional to the angular velocity of the rotating platform; that is, there is one or more differences in time for each light path in the light travelling in opposite directions. The interference pattern generated by the phase-shift at a particular angular velocity of the platform is therefore a function of that angular velocity. The Sagnac interferometer measures its own angular velocity with respect to the local inertial frame, and can thus be used as the reference for an IGS.

Figure 2:
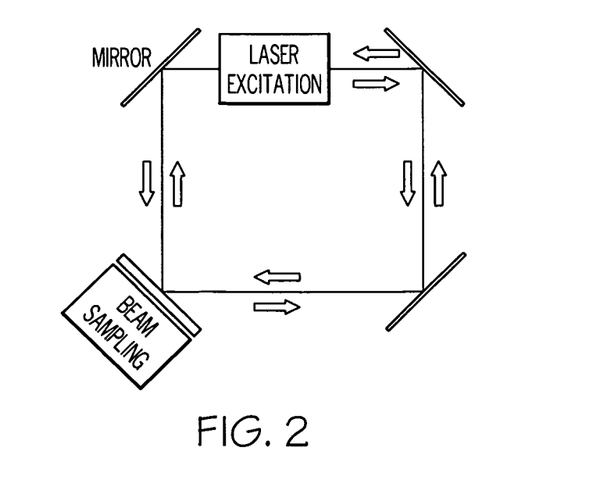
FIG. 2 depicts an example embodiment of a ring laser in accordance with this disclosure.

A passive ring interferometer uses light entering the assembly from outside, generating an interference pattern that is used to measure a phase shift. At the beam sampling location, a fraction of each of the counter-propagating beams exits the laser cavity. It is also possible to construct a self-contained ring interferometer. The light is generated and sustained by laser incorporated inside the light path. The ring-shaped laser cavity is enclosed, and the lasing medium must not come in contact with outside air. This setup, depicted by FIG. 2, is called a ring laser.

As the laser excitation is started, the atoms or molecules inside the cavity emit photons. Since the atoms have a thermal velocity, however, the light inside the laser cavity initially has a range of frequencies, corresponding to the statistical distribution of velocities. Through the process of stimulated emission, one frequency quickly becomes dominant and the light effectively becomes monochromatic. A photon emitted in a counter-clockwise direction is, on average, Doppler-shifted to a higher frequency, and a photon that is emitted in clockwise direction is, on average, Doppler-shifted to a lower frequency. The upwards Doppler-shifted photons are more likely to stimulate emission on interaction with molecules that they "catch up with", and the downwards shifted photons are more likely to stimulate emission on interaction with molecules that they meet "head on". Seen in this way, the fact that the ring laser generates two frequencies of laser light is a direct consequence of the fact that everywhere along the ring the velocity of light is the same in both directions. The constancy of the speed of light acts as a constant background, and the molecules inside the laser cavity have a certain velocity with respect to that background. This constant background is referred to as inertial space.

The laser light that is generated is sampled by causing a fraction of the light to exit the laser cavity. By bringing the two frequencies of laser light to interference, a beat frequency is obtained; the beat frequency is the difference between the two frequencies. This beat frequency can be thought of as an interference pattern in time. (The more familiar interference fringes of interferometry are a spatial pattern). The period of this beat frequency is linearly proportional to the angular velocity of the ring laser with respect to inertial space. In the case of ring laser interferometry there is no need for calibration. (In a sense one might say that the process is self-calibrating). The beat frequency will be zero if and only if the ring laser setup is non-rotating with respect to inertial space.

Because of the way the laser light is generated, light in laser cavities has a strong tendency to be monochromatic, and usually that is precisely what laser apparatus designers want. This tendency to not split in two frequencies is called "lock-in". The ring laser devices incorporated in navigational instruments (to serve as RLGs) are generally too small to go out of lock spontaneously. By "dithering" the gyroscope through a small angle at a high audio frequency rate, going out of lock is ensured.

Figure 3:
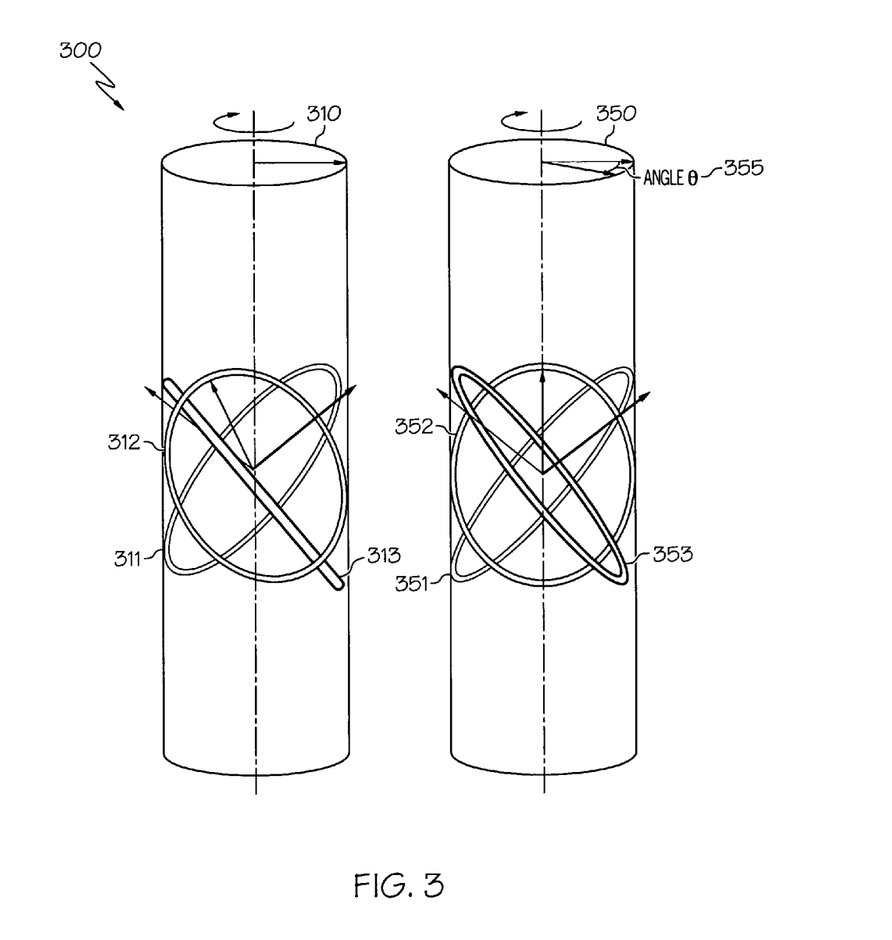
FIG. 3 depicts an example embodiment of three FOGs' elliptical fiber optic cable coils having a mutually orthogonal arrangement, wherein the arrangement is collectively titled relative to the tube on which the coils are located in accordance with this disclosure.

Turning now to FOGs, a FOG, which is normally circular in shape, can be mounted in a plane normal to the borehole axis, such that the final assembly may embody a large diameter (approximately the same size as the borehole assembly, but likely just slightly smaller. Three elliptical FOGs may be assembled in a mutually orthogonal arrangement to form an inertial measurement unit (IMU), such that the assembly may be mounted within the wall of a tube. In the alternative, the mutually orthogonal arrangement may be freestanding, i.e., not surrounding a tube, and, instead, the arrangement is maintained due to the integral strength of the FOG's components, wherein optional adhesive materials may be added to augment the inherent integrity of the FOGs. An example embodiment of a device 300 undergoing movement and having a mutually orthogonal arrangement as just-discussed is depicted in FIG. 3. While elliptical fiber optic cable coils afford certain advantages to the thickness of the tube in or on which the device 300 may be mounted, other shapes of fiber optic cable coil may also be used, even though such an embodiment may afford a smaller inner diameter to the device 300. Preferably, the measurements derived from the gyroscope are aided by additional information, such as accelerometers or the depth of the drill string measured from surface. The tube may then be mounted adjacent or integral to a drill string BHA. A modified embodiment of a conventional FOG where the fiber coil is elliptical rather than circular may be used.

Returning to FIG. 3, depicted is the same device 300 undergoing rotation. Device 310 shows the device 300 in an initial position, wherein the axes 311, 312, and 313 of the mutually orthogonal arrangement of the three elliptical fiber optic cable coils comprising the FOGs are depicted. Upon rotating device 310 an angle 355, the same device 310 is depicted as device 350 having axes 351, 352, and 353 of the mutually orthogonal arrangement of the three elliptical fiber optic cable coils comprising the FOGs that correspond to axes 311, 312, and 313 of the device 310. Although FIG. 3's arrangement does not provide a direct correlation of gyroscope outputs to each of the conventional MWD parameters used (i.e., azimuth, inclination and tool facing), these outputs are readily derived from a vector sum of the gyroscope outputs. This arrangement of gyroscopic elliptical fiber optic cable coils is advantageous for many reasons, such as: (1) the coils may be significantly larger than a typical compact FOG gyroscope, and thus providing much improved performance; (2) mounting of the fiber coils in an annular manner minimizes impingement of the measuring apparatus into the inner diameter of a tube, if used, without increasing its outer diameter, and thus enabling significant through-flow of drilling mud through the device in an MWD application; and (3) three orthogonal FOGs may be used in conjunction with a three-axis accelerometer arrangement to form a complete IMU. This enables embodiments whereby the downhole instrument can derive spatial position autonomously, i.e. independent of measured drill string depth, through enabling logic reduced to hardware and/or software, and processed by a processor-based device such as further described elsewhere herein. Embodiments providing autonomous downhole positional information enables closed-loop depth information to be available to Rotary Steerable Tools (RSTs), reducing or eliminating the need for communication with surface, e.g., via telemetry, and providing substantially faster feedback to the RST, thus enabling smoother well bores to be drilled.

While elliptical fiber coils afford certain advantages to the thickness of the tube on which the arrangement is located, other shapes, i.e., non-elliptical, for the fiber optic cable coils may also be used, even though such embodiments may afford a smaller inner diameter to the apparatus. Similarly, the optional tube on which the fiber optic cables are located may be cylindrical or other shapes that do not depart from the mutually orthogonal arrangement and spirit and scope of this disclosure.

Figure 4:
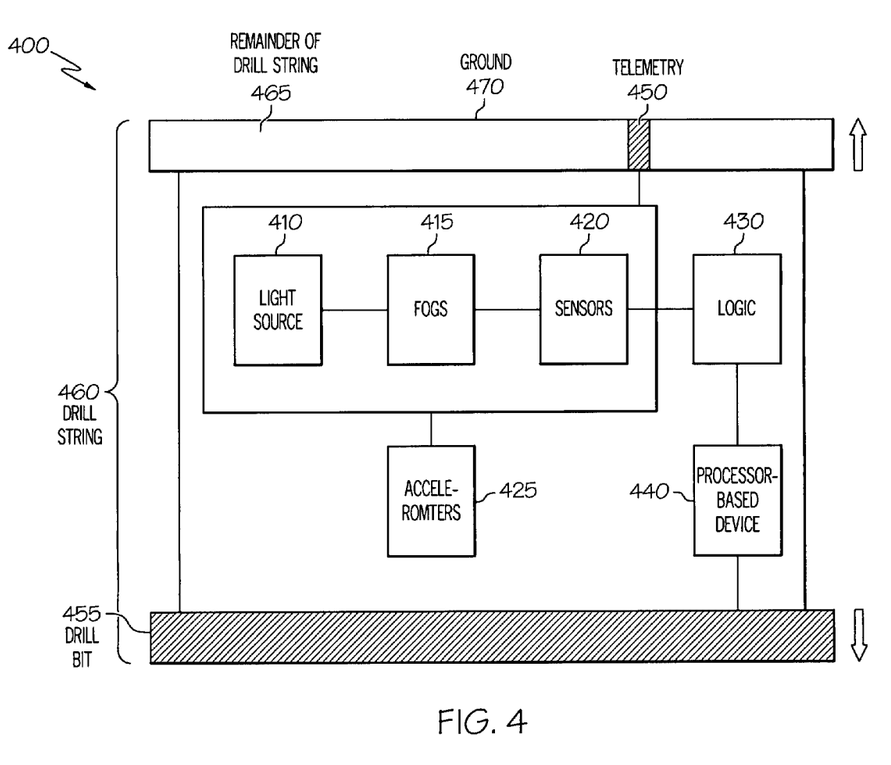
FIG. 4 depicts an example embodiment of a system in accordance with this disclosure.

Moving on, FIG. 4 depicts an example embodiment of a system 400 in block diagram form. The system 400 includes a light source 410, whether integral or external to the FOGS 415, that provides light to three FOGS 415, wherein these FOGS 415 have elliptical fiber optic cable coils in a mutually orthogonal arrangement that is tilted relative to a longitudinal axis of a solid or hollowed tube. Else, by way of another example, the arrangement is tilted relative to a horizontal plane having a vertical plane normal to the horizontal plane. See, e.g., FIGS. 3, 5. Adhesive substances may be used to enhance the inherent integrity of the arrangement. The elliptical coils allow for a smaller cross-sectional area within the system 400 as compared to non-elliptical coils, when all else remains constant in view of producing the same accurate detections and calculations based thereon.

Returning to FIG. 4, the system 400 further includes sensors 420 that may detect one or more differences in time for each path of light travelling in the opposition directions within each one of the elliptical fiber optic cable coils of the arrangement. As previously discussed, the Sagnac effect explains the one or more differences of the travelling light paths in opposite directions, wherein the differences will be measured by the sensors 420 in communication with the FOGS 415 upon any rotation experienced by the system 400. To also detect changes in position, the system 400 includes accelerometers 425, and, thereby, the system 400 described in this paragraph, thus far, becomes an IMU. Accordingly, the system 400 may detect the accurate location of the system 400, itself, undergoing any movement, i.e., positional, pitch, roll, yaw, etc., or, as shown in FIG. 4, may be used to detect the precise location of an associated device, such as drill bit 455, undergoing any movement, without any reliance on external factors—an absolute measurement.

Figure 7:
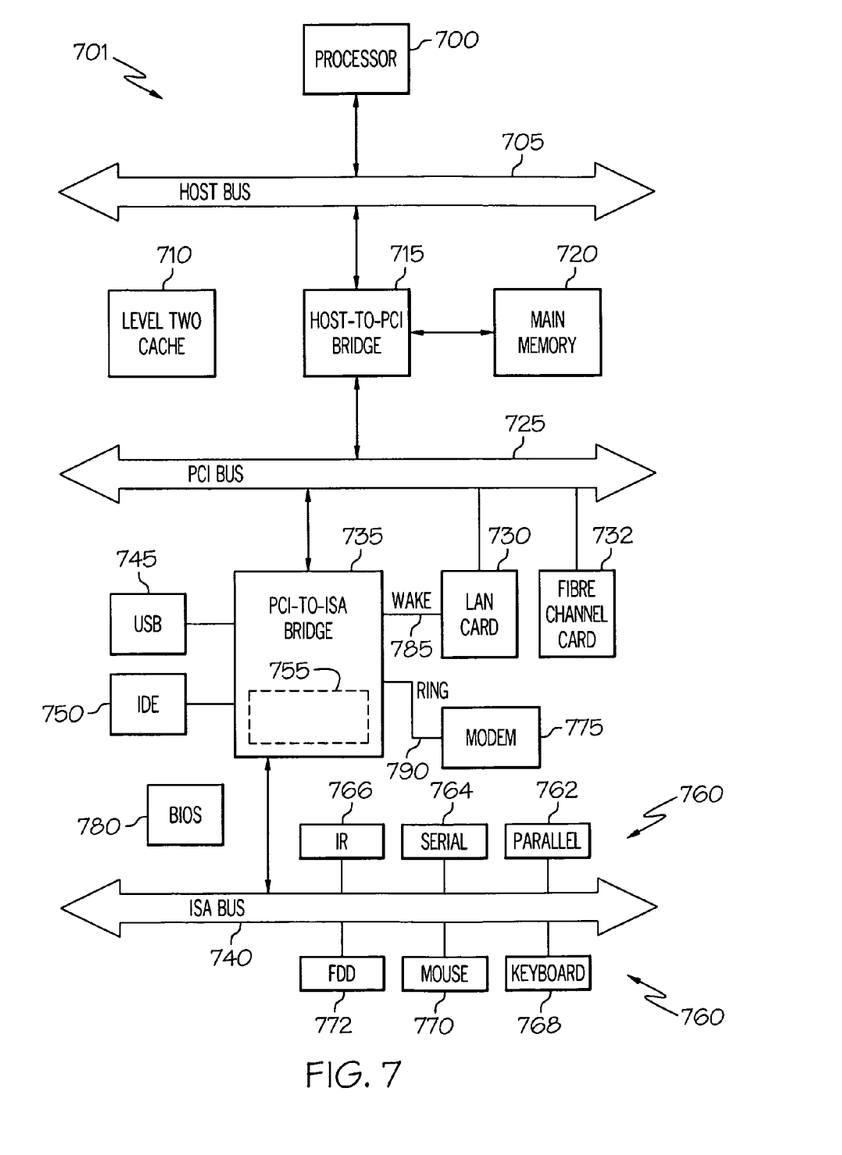
FIG. 7 depicts an example embodiment of a processor-based device capable of use with devices, methods and systems disclosed herein.

The system 400 may also include logic 430, whether reduced to hardware or code, for calculating the detected data from the accelerometers 425 and/or sensors 420, wherein the communication between and among the foregoing, and any component in the system 400 for that matter, may be through non-depicted wired or wireless network communication, such as Bluetooth™, IRDA, LAN, WAN, or the depicted telemetry 450. Here, the exemplary telemetry 450 is depicted as connecting the primary components of the system 400 in the drill string 460 through the remainder of the drill string 465 to the ground 470, where there may be associated devices for monitoring or managing the system 400. The logic 430 may include further enabling logic 430, whether reduced to hardware and/or software, such as through one or more applications with modules, for orienting, e.g., steering and/or navigating, the system 400 or an associated device or object, such as a drill bit 455 located at the bottom of the drill string 460. Implementation and execution of the logic 430 may be performed by a processor-based device 440, including one or more state machines, wherein an example processor-based device is depicted at FIG. 7 and more fully described elsewhere herein. In one example, the processor-based device 440 may implement and/or execute the logic 430 in communication with it 440 either primarily local or distant to the primary component portion of the system 400 or an associated device, such as drill bit 455. By being local, and rather than having to heavily rely on telemetry 450 or the like as likely the case with being distant, then the system 400, through the enabling logic 430, permits orientation of the system 400 or an associated device, such as drill bit 455. This is helpful, especially in a deep downhole environment, because the enabling, executed logic 430 allows the system 400 to be moved where the operator wants the system 400, or any associated device, to be moved through use of the processor-based device 440. For example, if the logic 430 includes parameters in volatile or nonvolatile memory such as resistivities, then the implemented and/or executed logic 430 may allow the processor-based device 440 to orient, manually or autonomically, the system 400 in order to steer or navigate away from low-resistivity substances, e.g., water, so that the system 400 does not drill into water downhole. Thus, in the foregoing example, the logic 400 may permit an increased horizontal drilling before returning to vertical drilling so as to avoid a water bed. Countless other examples of the implemented and executed logic 430 by the optional processor-based device 440 are possible that are within the spirit and scope of this disclosure.

It is noteworthy that for the downhole environment example depicted in FIG. 4, the system 400 is not drawn to scale. Instead, the primary component portion, that is, those items between drill bit 455 and the remainder of the drill string 465, are only enlarged for clarity of this disclosure. Likely, the primary component portion of the system 400 is slightly smaller than the drill bit 455 so that the forces exerted on the primary component portion is less during drilling. Instead, the brunt of the forces should be borne by the drill bit 455 that is drilling the hole into the ground 470, whereby the slightly smaller primary component portion will, in essence, be protected from the forces. For instance, if the drill bit 455 is a six inch diameter device, then the primary component portion of the system 400 may be 5⅞ inches at its greatest diameter even if there are smaller diameters within the primary component portion aimed at protecting certain items within the primary component portion, e.g., a double housing.

Figure 5:
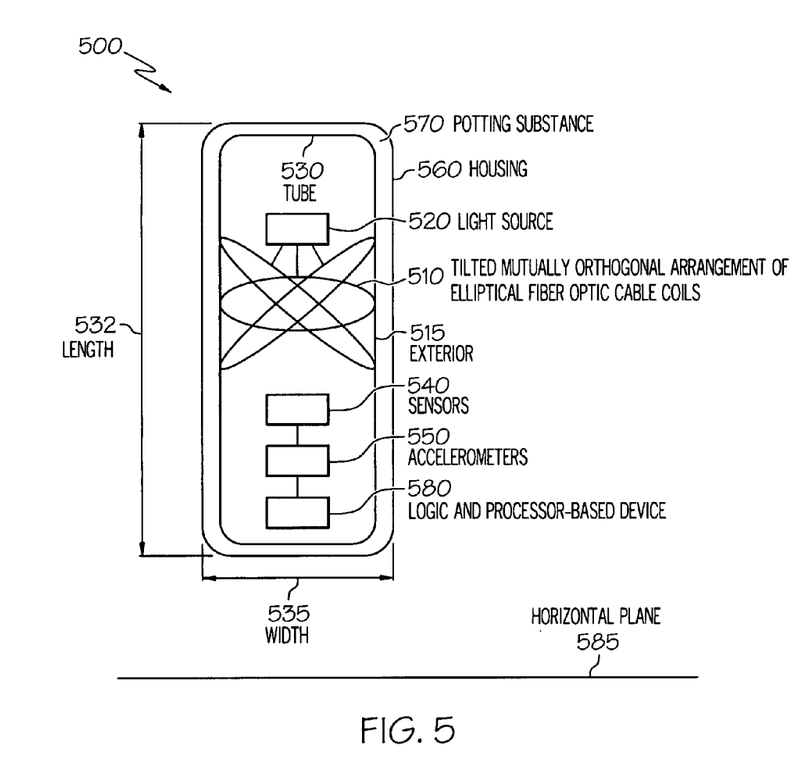
FIG. 5 depicts an example embodiment of a device in accordance with this disclosure.

Although the system 400 of FIG. 4 also enablingly describes exemplary devices, FIG. 5 is offered for assured discussion of certain features of exemplary devices in accordance with this disclosure. In one example embodiment, the device 500 includes a tube 530 having an exterior 515 that may have a sealed protective housing 570 in order to protect the delicate items optionally therein, such as the tiled mutually orthogonal arrangement of elliptical fiber optic coils 510 of the FOGS as well as the FOGS themselves, a light source 520, sensors 540, accelerometers 550, logic and a processor-based device 580. Rather than within the housing 560, the foregoing, ordinarily delicate items may be merely associated with the device 500 through wired or wireless communication, and, to that end, may not be within the housing 560, but, instead, may be within one or multiple other housings, or, not within such housings due to the inherent robust integrity of the substances used for these delicate items. The tube 530, itself, may be solid or hollow. In the solid case, any or all of the delicate items may be integrated into the tube 530 so that it 530 is at least effectively a solid tube 530. Similarly, in the hollow case, any or all of the delicate items may be within the tube 530, which may be made of metal, polymeric materials or other substances that impart integrity as a supporting shaft.

The device 500 includes three FOGS placed along the exterior 515 of a tube 530, wherein the FOGS comprise elliptical fiber optic cable coils in a mutually orthogonal arrangement that is tilted 510 relative to mutually orthogonal axes of the tube, wherein one of the mutually orthogonal axes may be along a length 532 of the tube 530 and another one of the mutually orthogonal axes may be along a width 535 of the tube 530, wherein the length 532 is at least equal in size to the width 535. See, e.g., FIG. 3. As previously discussed herein, if the tilted arrangement 510 is not located on a cylinder tube 515 or the like, then the tilted arrangement 510 may stand alone, i.e., maintain a shape due to its 510 integral strength and/or through the use of adhesives. In such a case, the tilted arrangement 510 is tilted relative to a horizontal plane 585 having an non-depicted vertical plane normal to the horizontal plane 585. Whether or not located on an exterior of a tube 530, such as within grooves along the exterior 515 that may fix and secure the arrangement 510, the arrangement 510 may be within a potting substance 570 or coated with a potting substance 570 for thermal equalization purposes for instance. The use of a potting substance 570 is aimed, once again, at protecting the device 500, such as the device 500 may experience in temperature and pressure, for example, when the device 500 plunges into downhole drilling environments.

Importantly, the tilted, elliptical arrangement 510 enables the fiber optic cable coils to be larger than conventional uses of FOGS. Since larger FOGS produce more accurate gyroscopic measurements, when all else is constant, then this disclosure's arrangements and methods allows for improved measurements, such as in IMUs. Furthermore, and without sacrificing accuracy, the elliptical nature of the coils allows the disclosed arrangements 510 and disclosed methods dependent on the same 510 to be mounted, such as on a tube 530, with a small cross-section, which is important so as to not infringe on the inner or outer diameter of an associated device or device, such between a drill bit on a drill string and the remaining portion above the drill string. The inner diameter of the drill string may have other components necessary for the drilling operation as well as allowing fluid to be pumped through and out to the ground. Similarly, the outer diameter is ideally limited by the diameter of the drill bit as previously discussed. Thus, in this example, this disclosure's arrangements and methods provide improved accuracy without simultaneously and negatively impacting on size constraints.

Figure 6:
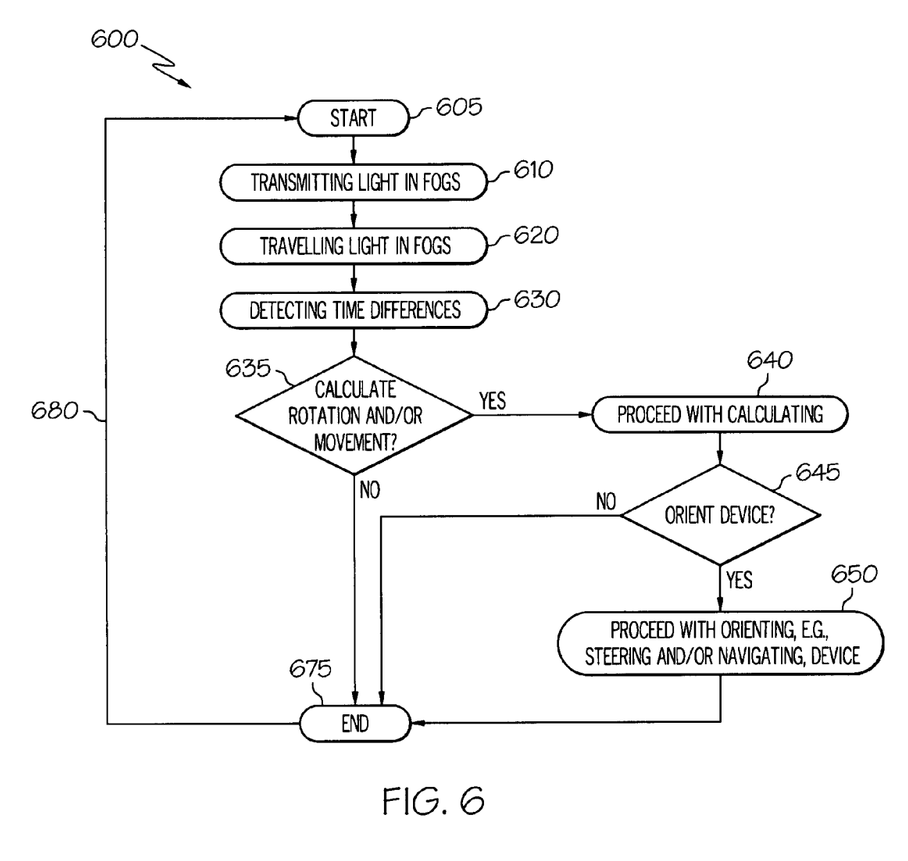
FIG. 6 depicts an example flowchart of a method in accordance with this disclosure.

FIG. 6 draws particularized attention to yet another aspect of the disclosure even though the disclosure, as a whole, discloses such. In particular, an embodiment of a flowchart 600 of an example method is disclosed. Flowchart 600 starts 605 by transmitting 610 light within FOGS, optionally located on a tube, wherein the FOGS comprise elliptical fiber optic cable coils in a mutually orthogonal arrangement, wherein the mutually orthogonal arrangement is tilted relative to longitudinal axis of a solid or hollowed tube. The transmitted 610 light, itself, may be received from a light source within the FOGS or external to the FOGS but in communication with the FOGS. Light travels 620 in opposite directions within each of the elliptical fiber optic cable coils. Thereafter, one or more differences in time are detected 630, by one or more sensors, for each light path by the travelling 620 of the light in the opposite directions when there is rotation.

The flowchart 600 continues to decision block 635 that queries whether to calculate rotation and/or movement. If not, the flowchart 600 ends 675. If yes, then as previously and subsequently discussed herein, enabling logic, reduced to hardware and/or software, proceeds 640 with calculating 640 rotation and/or movement so that the accurate location of a device, system, or associated device or system is known. Again, the calculations may be accomplished through execution of the logic by an associated processor-based device. Using the calculations 640, another decision block 645 queries whether to orient the device. If no, then the flowchart 600 ends 675. If yes, then as previously and subsequently discussed herein, enabling logic, reduced to hardware and/or software, proceeds 650 with orienting 640, such as manually or autonomously steering and/or navigating a device, system, or associated device or system. The logic executed by the associated processor-based device may permit autonomic steering and/or navigating the associated device undergoing orientation through enabling logic ideally local to the associated device. Alternatively and additionally, the logic executed by the associated processor-based device may permit manual steering and/or navigating of the associated device undergoing orientation through enabling logic local or distant from the associated device, but preferably local to avoid reliance on slow transmission of data through telemetry. The flowchart 600 then ends 675. However, for most purposes, flowchart 600 would begin again, as evidenced by re-looping line 680, so that, for instance, measuring and navigation could continue as the drilling continues, i.e., the associated device is moving.

FIG. 7 illustrates information handling system 701 which is a simplified example of a computer system, such as processor-based device for storing, executing, and/or otherwise utilizing the logic for at least measuring, calculating, orienting, e.g., steering and/or navigating, and capable of performing the operations described herein. The information handling system 701 may be local or distant to the same or another device or system in order to permit local and/or distant implementation and/or execution of associated logic, wherein distant is more likely to also have associated telemetry for remote location being employed. A local information handling system 701 is more likely for the disclosed devices, systems and methods having logic enabling manual or autonomic orienting and navigating executed by the information handling system 701. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices may be attached to various interfaces 760 (e.g., parallel interface 762, serial interface 764, infrared (IR) interface 766, keyboard interface 768, mouse interface 770, fixed disk (HDD) 772, and non-depicted removable storage device(s)) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer-readable storage medium, including magnetic storage media, optical storage media, flash memory, random access memory, read only memory, and so forth. In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735. Although not depicted, computer system 701 may be, and likely is, connected to one or more view screens or other displays for users to see their optional interaction with computer system 701.

While the computer system described in FIG. 7 is capable of executing the disclosure described herein, this computer system is simply one example of a processor-based device. Those skilled in the art will appreciate that many other computer system designs, including state machines, are capable of performing the disclosure described herein. For example, the processor-based device may not use IDEs, PCIs, ISAs, or FDDs, but such processor-based devices are still understood to impart the functionality for the purpose of the processor-based device disclosed herein. To that end, it is likely that the data, e.g., measurements, from the FOGs and associated accelerometers, etc., are transmitted to the -based device from an associated interface, in some standard protocol.

Another embodiment of the disclosure is implemented as a program product for use within a device such as, for example, those systems and methods depicted in FIGS. 1-6. The program(s) of the program product defines functions of the embodiments (including the methods described herein) and can be contained on a variety of data-bearing media. Illustrative data-bearing media include, but are not limited to: (i) information permanently stored on non-writable storage-type accessible media (e.g., read-only memory devices within a computer such as CD-ROM disks readable by a CD-ROM drive); (ii) alterable information stored on writable storage-type accessible media (e.g., floppy disks within a diskette drive or hard-disk drive); and (iii) information conveyed to a computer by a communications medium, such as through a computer or telephone network, including wireless communications. The latter embodiment specifically includes information downloaded onto either permanent or even sheer momentary storage-type accessible media from the World Wide Web, an internet, and/or other networks, such as those known, discussed and/or explicitly referred to herein. Such data-bearing media, when carrying computer-readable instructions that direct the functions of the present disclosure, represent embodiments of the present disclosure.

In general, the routines executed to implement the embodiments of this disclosure, may be part of an operating system or a specific application, component, program, module, object, or sequence of instructions. The computer program of this disclosure typically comprises a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of this disclosure. However, it should be appreciated that any particular program nomenclature that follows is used merely for convenience, and thus this disclosure should not be limited to use solely in any specific application identified and/or implied by such nomenclature.

While the foregoing is directed to example embodiments of this disclosure, other and further embodiments of this disclosure may be devised without departing from the basic scope thereof, and the scope thereof is determined by the claims that follow.

What is claimed is:

1. A device, comprising:
a tube having an exterior;
a light source in communication with the fiber optic gyroscopes; and
fiber optic gyroscopes placed along the exterior, wherein the fiber optic gyroscopes comprise elliptical fiber optic cable coils in a mutually orthogonal arrangement, wherein the mutually orthogonal arrangement is tilted relative to a longitudinal axis of the tube.

2. The device of claim 1, wherein the light source is integrated into the fiber optic gyroscopes.

3. The device of claim 1, wherein the light source is external to the fiber optic gyroscopes.

4. The device of claim 1, further comprising one or more sensors in communication with the elliptical fiber optic cable coils.

5. The device of claim 4, wherein the one or more sensors are attached to the device.

6. The device of claim 1, further comprising a housing surrounding the device.

7. The device of claim 6, further comprising a potting substance between the housing and at least the exterior.

8. The device of claim 6, further comprising a protective, thermal equalization substance between the housing and at least the exterior.

9. The device of claim 2, further comprising logic for calculating rotation of an associated device.

10. The device of claim 2, further comprising one or more accelerometers in communication with the device.

11. The device of claim 10, wherein the one or more accelerometers are attached to the device.

12. The device of claim 10, wherein the logic comprises additional logic for calculating movement of the associated device.

13. The device of claim 9, wherein the logic further comprises logic for orienting the associated device.

14. The device of claim 12, wherein the logic further comprises logic for orienting the associated device.

15. The device of claim 9, wherein the logic is at least primarily implemented and executed local to the device and the associated device.

16. The device of claim 9, wherein the logic is at least primarily implemented and executed distant to the device and the associated device through use of telemetry coupled to the device.

17. The device of claim 9, wherein the logic comprises at least partially software executed by a processor-based device in communication with the device.

18. The device of claim 17, wherein the processor-based device is attached to the device.

19. The device of claim 9, wherein the logic comprises at least partially hardware in communication with the device.

20. The device of claim 19, wherein the hardware is attached to the device.

21. The device of claim 10, wherein the device comprises an inertial measurement unit for an inertial guidance system.

22. The device of claim 6, wherein the housing is affixed to the exterior.

23. The device of claim 6, wherein the housing is a sealed housing.

24. The device of claim 1, wherein the exterior further comprises grooves for placement of the elliptical fiber optic cable coils in the mutually orthogonal arrangement.

25. The device of claim 1, wherein the device is a component of a drill string.

26. The device of claim 1, wherein the device is a mounted at least to proximate to a drill bit.

27. The device of claim 26, wherein the device comprises a diameter that is smaller than a hole drilled by the drill bit.

28. The device of claim 1, wherein the device comprises a device for use in a downhole environment.

29. The device of claim 4, wherein the device comprises a device for detecting the azimuthal component of an inertial measurement unit for an inertial guidance system.

30. The device of claim 1, wherein the tube is cylindrical.

31. The device of claim 30, wherein the tube comprises one or more strong metals.

32. The device of claim 30, wherein the tube comprises one or more strong polymers.

33. The device of claim 1, wherein the mutually orthogonal arrangement comprises elliptical fiber optic cable coils having integral strength sufficient to maintain a shape of the mutually orthogonal arrangement.

34. The device of claim 1, wherein the mutually orthogonal arrangement maintains a shape through one or more adhesive substances.

35. A method, comprising:
   transmitting light within fiber optic gyroscopes placed along an exterior of a tube, wherein the fiber optic gyroscopes comprise elliptical fiber optic cable coils in a mutually orthogonal arrangement, wherein the mutually orthogonal arrangement is tilted relative to a longitudinal axis of the tube;
   travelling, by the light from a light source in communication with the fiber optic gyroscopes, in opposite directions within each of the elliptical fiber optic cable coils; and
   detecting, by one or more sensors, one or more differences in time for each light path by the travelling of the light in the opposite directions within each one of the elliptical fiber optic cable coils.

36. The method of claim 35, wherein the light source is integrated into the fiber optic gyroscopes.

37. The method of claim 35, wherein the light source is external to the fiber optic gyroscopes.

38. The method of claim 35, further comprising one or more sensors in communication with the elliptical fiber optic cable coils.

39. The method of claim 38, wherein the one or more sensors are attached to the device.

40. The method of claim 35, further comprising a housing surrounding the device.

41. The method of claim 40, further comprising a potting substance between the housing and at least the exterior.

42. The method of claim 40, further comprising a protective, thermal equalization substance between the housing and at least the exterior.

43. The method of claim 36, further comprising logic for calculating rotation of an associated device.

44. The method of claim 36, further comprising one or more accelerometers in communication with the device.

45. The method of claim 44, wherein the one or more accelerometers are attached to the device.

46. The method of claim 44, wherein the logic comprises additional logic for calculating movement of the associated device.

47. The method of claim 43, wherein the logic further comprises logic for orienting the associated device.

48. The method of claim 36, wherein the logic further comprises logic for orienting the associated device.

49. The method of claim 43, wherein the logic is at least primarily implemented and executed local to the device and the associated device.

50. The method of claim 43, wherein the logic is at least primarily implemented and executed distant to the device and the associated device through use of telemetry coupled to the device.

51. The method of claim 43, wherein the logic comprises at least partially software executed by a processor-based device in communication with the device.

52. The method of claim 51, wherein the processor-based device is attached to the device.

53. The method of claim 43, wherein the logic comprises at least partially hardware in communication with the device.

54. The method of claim 53, wherein the hardware is attached to the device.

55. The method of claim 44, wherein the device comprises an inertial measurement unit for an inertial guidance system.

56. The method of claim 40, wherein the housing is affixed to the exterior.

57. The method of claim 40, wherein the housing is a sealed housing.

58. The method of claim 35, wherein the exterior further comprises grooves for placement of the elliptical fiber optic cable coils in the mutually orthogonal arrangement.

59. The method of claim 35, wherein the device is a component of a drill string.

60. The method of claim 35, wherein the device is a mounted at least to proximate to a drill bit.

61. The method of claim 60, wherein the device comprises a diameter that is smaller than a hole drilled by the drill bit.

62. The method of claim 35, wherein the device comprises a device for use in a downhole environment.

63. The method of claim 38, wherein the device comprises a device for detecting the azimuthal component of an inertial measurement unit for an inertial guidance system.

64. The method of claim 35, wherein the tube is cylindrical.

65. The method of claim 64, wherein the tube comprises one or more strong metals.

66. The method of claim 64, wherein the tube comprises one or more strong polymers.

67. The device of claim 35, wherein the mutually orthogonal arrangement comprises elliptical fiber optic cable coils having integral strength sufficient to maintain a shape of the mutually orthogonal arrangement.

68. The device of claim 35, wherein the mutually orthogonal arrangement maintains a shape through one or more adhesive substances.

* * * * *